Figure 1:
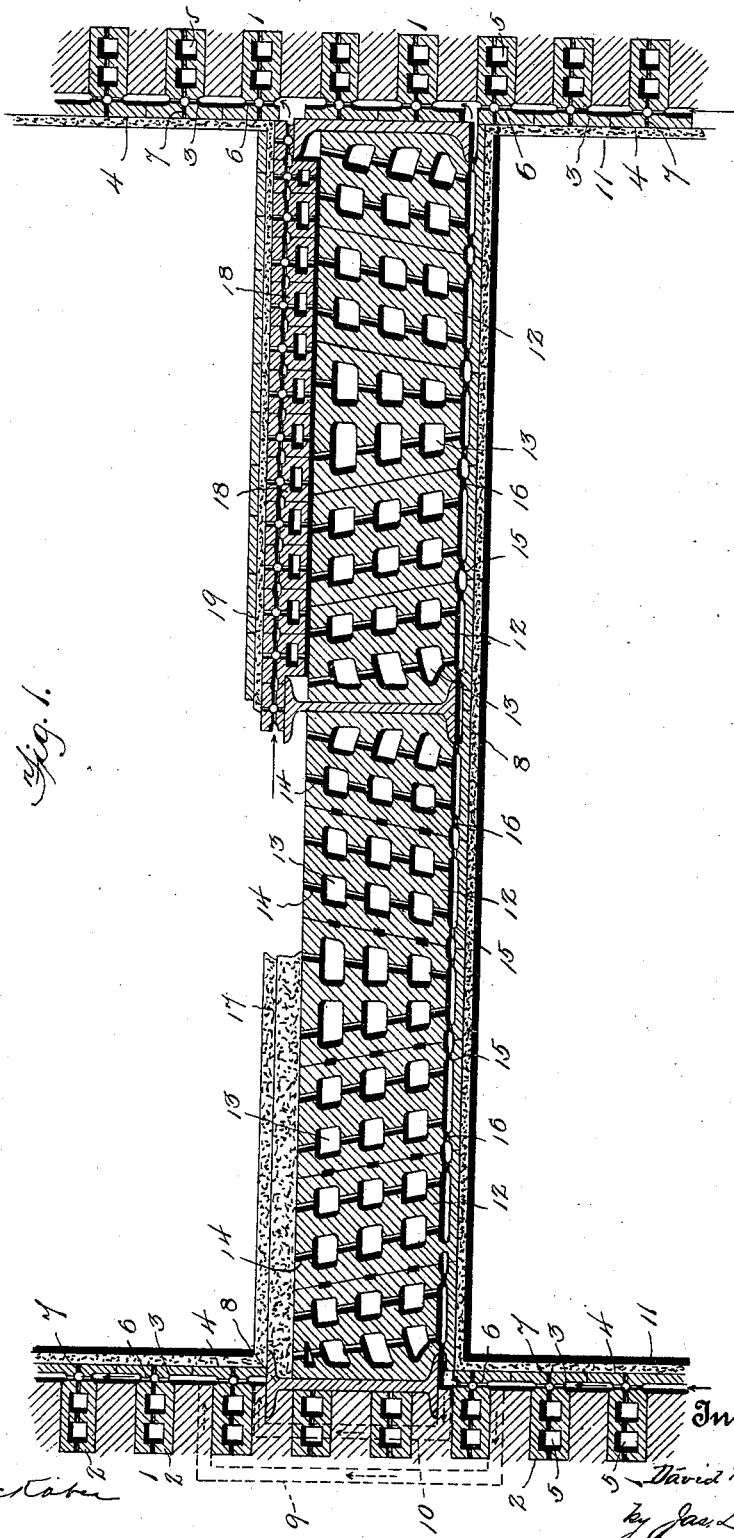

No. 687,105. Patented Nov. 19, 1901.
D. W. ANDERSON.
BRICK FOR MAKING STRUCTURES FIREPROOF.
(Application filed Mar. 19, 1901.)
(No Model.) 6 Sheets—Sheet 1.

Witnesses
Inventor
David W. Anderson
by Jas. L. Skidmore
his Attorney

No. 687,105. Patented Nov. 19, 1901.
D. W. ANDERSON.
BRICK FOR MAKING STRUCTURES FIREPROOF.
(Application filed Mar. 19, 1901.)
(No Model.) 6 Sheets—Sheet 2.
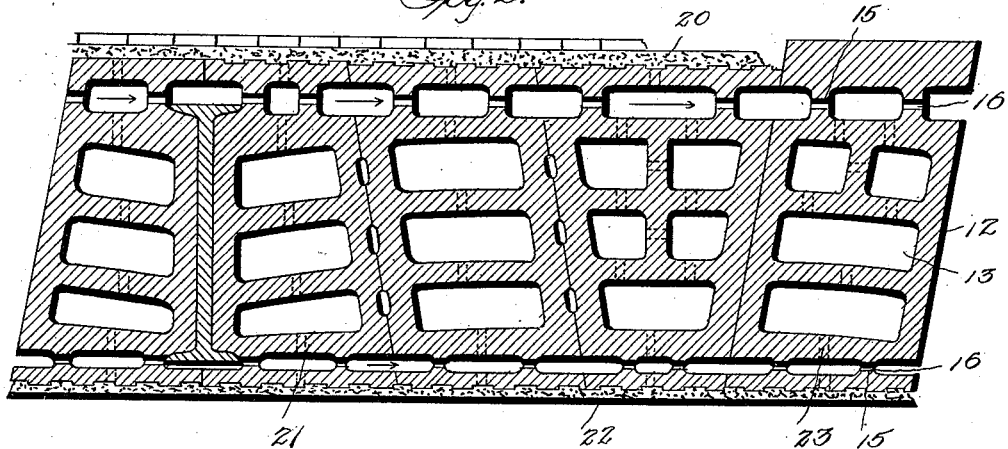
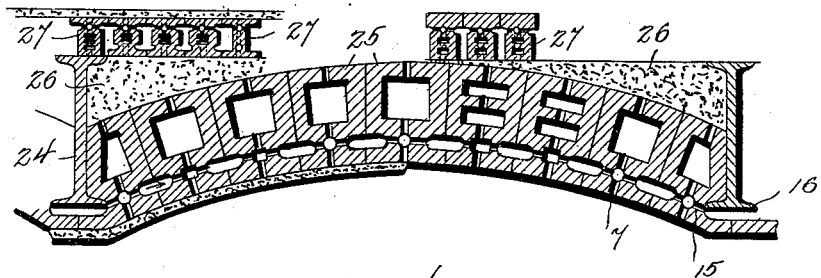
Witnesses
Inventor
David W. Anderson
by Jas. L. Skidmore
his Attorney.

No. 687,105. Patented Nov. 19, 1901.
D. W. ANDERSON.
BRICK FOR MAKING STRUCTURES FIREPROOF.
(Application filed Mar. 19, 1901.)
(No Model.) 6 Sheets—Sheet 3.

Witnesses
T. L. McClobe
E. P. Bungee

Inventor
David W. Anderson
by Jas. L. Skidmore
his Attorney.

THE NORRIS PETERS CO., PHOTO-LITHO., WASHINGTON, D. C.

No. 687,105. Patented Nov. 19, 1901.
D. W. ANDERSON.
BRICK FOR MAKING STRUCTURES FIREPROOF.
(Application filed Mar. 19, 1901.)
(No Model.) 6 Sheets—Sheet 4.

Witnesses
Inventor
David W. Anderson
by Jas. L. Skidmore
his Attorney.

No. 687,105. Patented Nov. 19, 1901.
D. W. ANDERSON.
BRICK FOR MAKING STRUCTURES FIREPROOF.
(Application filed Mar. 19, 1901.)

(No Model.) 6 Sheets—Sheet 5.

Witnesses
Inventor
David W. Anderson
by Jas. L. Skidmore
his Attorney.

THE NORRIS PETERS CO., PHOTO-LITHO., WASHINGTON, D. C.

No. 687,105. Patented Nov. 19, 1901.
D. W. ANDERSON.
BRICK FOR MAKING STRUCTURES FIREPROOF.
(Application filed Mar. 19, 1901.)

(No Model.) 6 Sheets—Sheet 6.

Witnesses
T. L. McKate
E. R. Dunnyea.

Inventor
David W. Anderson
By Jas. L. Skidmore
His Attorney,

UNITED STATES PATENT OFFICE.

DAVID WILEY ANDERSON, OF RICHMOND, VIRGINIA.

BRICK FOR MAKING STRUCTURES FIREPROOF.

SPECIFICATION forming part of Letters Patent No. 687,105, dated November 19, 1901.

Application filed March 19, 1901. Serial No. 51,888. (No model.)

*To all whom it may concern:*

Be it known that I, DAVID WILEY ANDERSON, a citizen of the United States, residing at Richmond, in the county of Henrico and State of Virginia, have invented certain new and useful Improvements in Bricks for Making Structures Fireproof; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to systems of ventilating fireproof buildings and to combined bricks and tiles for use in the construction of floors, ceilings, walls, columns, &c., for fireproof structures, and one of the principal objects of the same is to provide for a continuous and uninterrupted circulation of air in all directions through the filling or furring under the floors, above the ceilings, around columns, and throughout the walls of the buildings in order that in case of fire the hot air will not cause an explosion owing to its confinement within a limited space. In previous structures brick fillings for floors, arches, columns, &c., have been made hollow—that is, provided with an opening extending in one direction only—and when the building is completed the end openings are closed. In case of fire the confined air within these openings becomes very hot and expands to a degree which causes an explosion.

The principal object of my invention is to give a thorough circulation of air to all parts of fireproof buildings and to provide air-ducts which communicate with the open air at all times, thus preventing explosion and rendering the structure fireproof and practically indestructible.

Another object is to provide combined ventilated bricks and tiles designed for use in the construction of floors, ceilings, walls, arches, or columns, to provide a brick filling or furring which shall be light in weight, inexpensive to manufacture, which can be set quickly, and which will thoroughly ventilate the structure in all directions.

Another object is to provide a combined ventilated brick and tile which can readily be used as a filling or furring and a facing-tile for floors, columns, beams, or pillars, whether of steel, iron, or wood.

In the construction of fireproof buildings a combined brick and tile made in accordance with my invention can be used to advantage in many places for filling or facing floors, arches, columns, &c., and to render the structures durable, fireproof, and well ventilated.

As illustrating the varied uses of my present invention, the accompanying drawings show portions of structures made up in whole or in part with my brick and tile.

Figure 5:
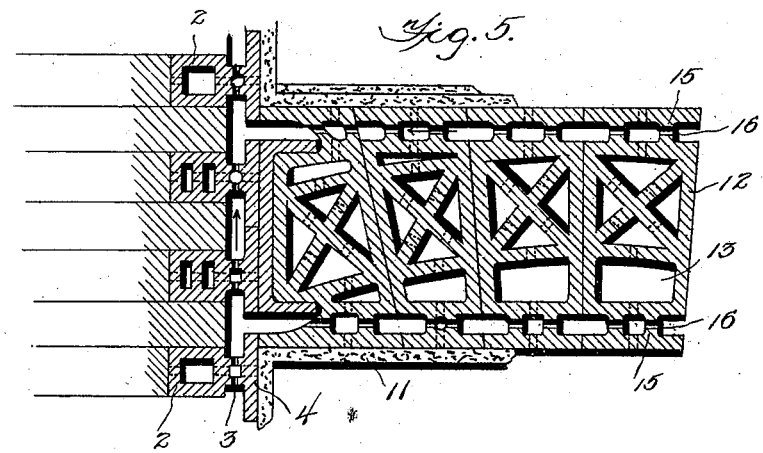
Figure 6:
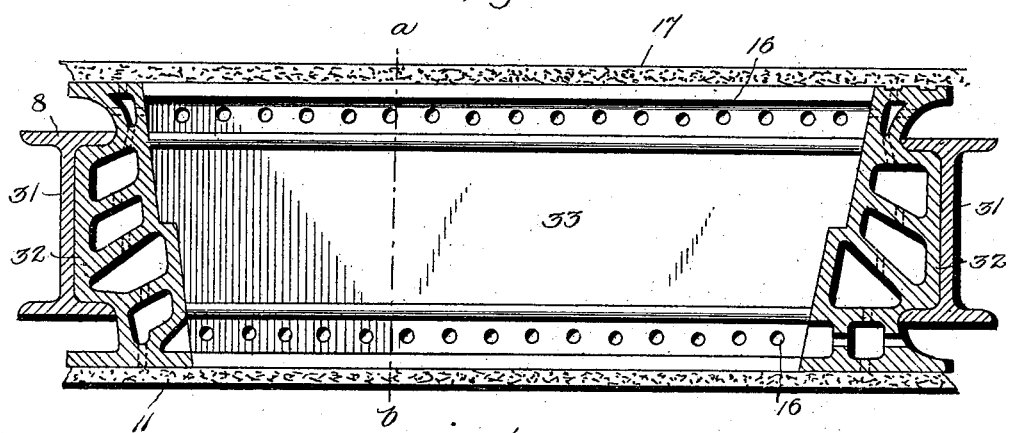
Figure 7:
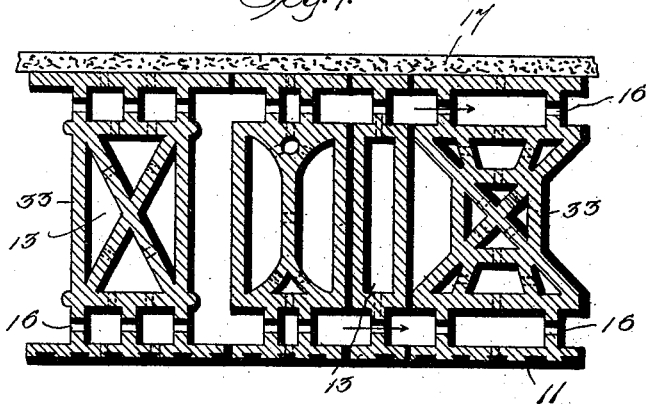
Figure 8:
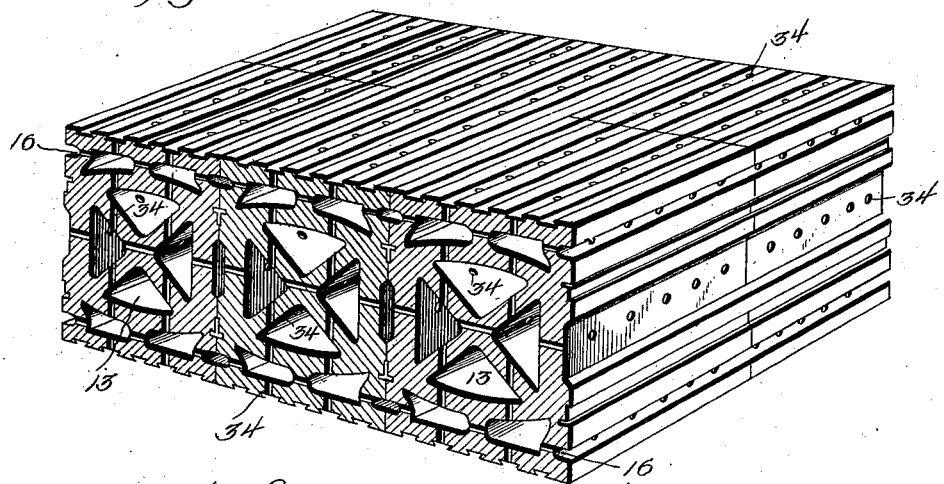
Figure 9:
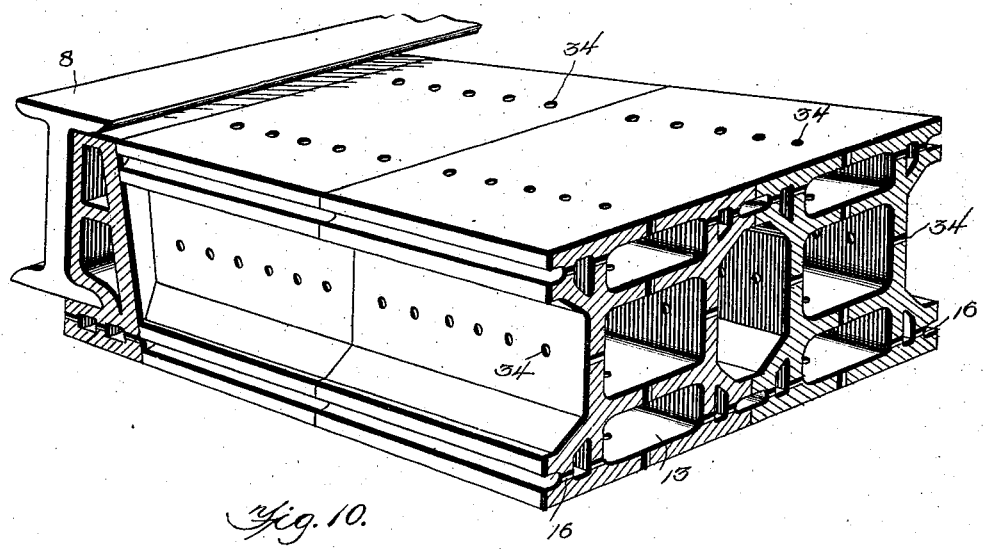
Figure 10:
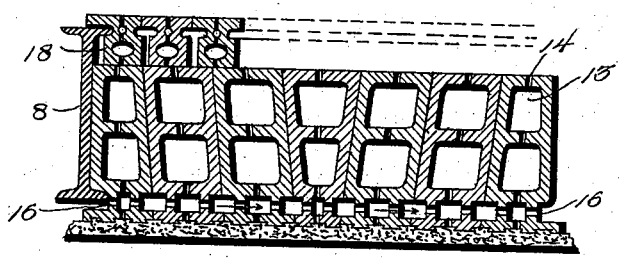
Figure 11:
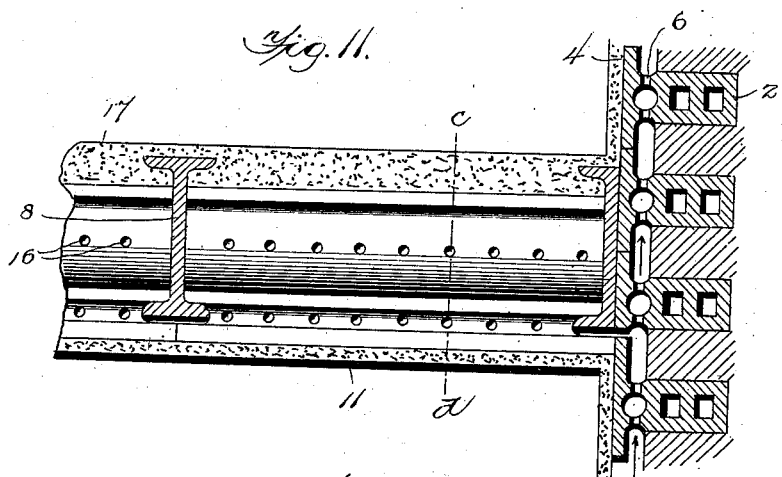
Figure 12:
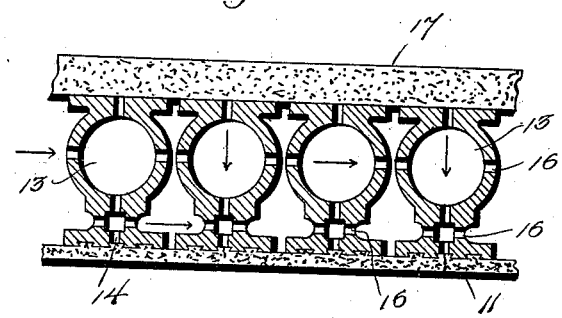
Figure 13:
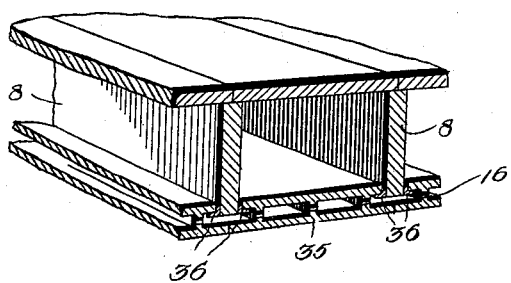
Figure 14:
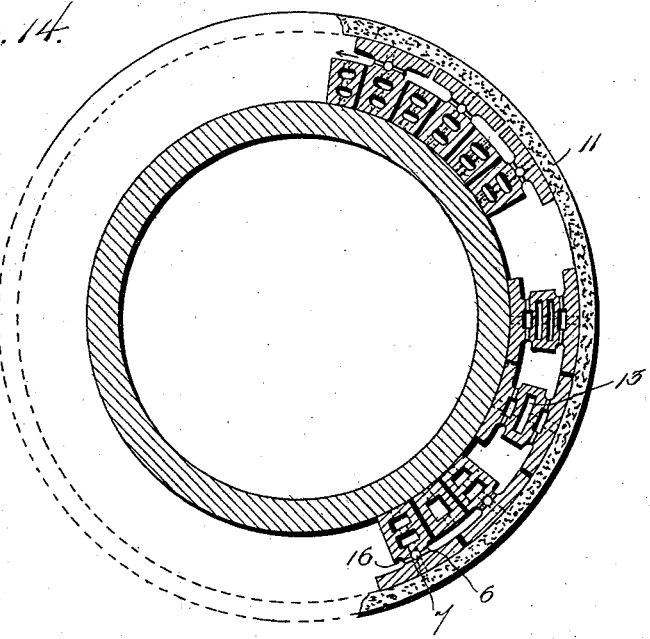
Figure 15:
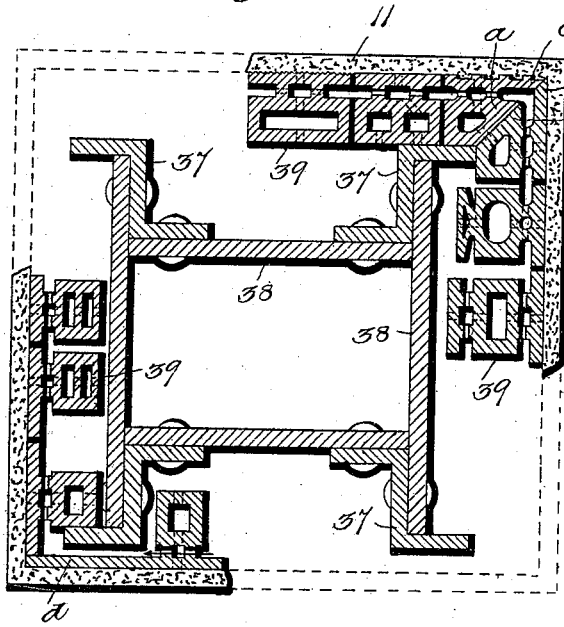
Figure 16:
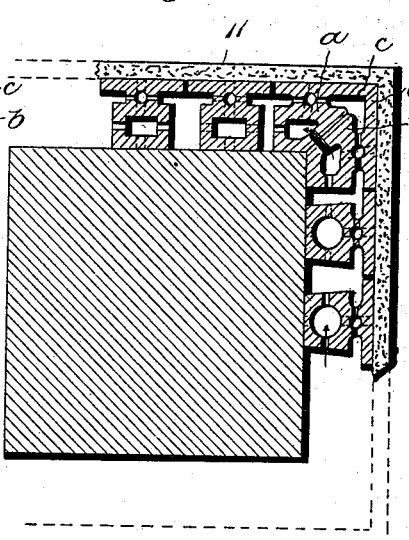

In said drawings, Figure 1 is a transverse section taken through a floor and walls, said figure illustrating my system of ventilating such structures by the use of my ventilated filling and brick tile. Fig. 2 is a fragmentary section of a floor and ceiling supported upon metal I-beams and composed of ventilated filling-blocks having either roughened faces to anchor the concrete or plaster or having glazed or finished faces to serve as tiling. Fig. 3 is a section through a segmental arch made up of ventilated filling-blocks supported on metal I-beams and small brick tile for ventilating the floor. Fig. 4 is a fragmentary section through a floor and ceiling made up of wooden beams and showing how such structures may be ventilated and rendered fireproof by my brick-tile facing or furring. Fig. 5 is a fragmentary section of a flat arch floor and ceiling supported upon channel-beams and illustrating how the walls are ventilated around the beams and throughout their extent. Fig. 6 is a section taken through a floor and ceiling made up of metal I-beams, skewbacks, and ventilated filling-blocks. Fig. 7 is a section on line *a b*, Fig. 6, and showing the various shapes which the ventilated filling-blocks may be given to serve my purpose. Fig. 8 is an isometrical view of a brick-tile construction made in accordance with my invention and showing air-ducts or ventilating-openings passing through the bricks in different directions. Fig. 9 is an isometrical view of a modified form of ventilated filling-blocks and skewback supported upon a metal I-beam. Fig. 10 is a fragmentary section of a floor and ceiling made up of ventilated filling-blocks, I-beams, and ventilated brick-tile floor-blocks. Fig. 11 is a fragmentary section of a floor, ceiling, and wall made up of metal beams and hollow ventilated filling-bricks. Fig. 12 is a fragmentary section taken on the line c d, Fig. 11. Fig. 13 is an isometrical view of a fragment of wood-beam floor with ventilated brick tiles secured to the beams by L-irons. Fig. 14 is a horizontal section through a round iron column and showing how my brick blocks or tiling may be applied thereto for ventilating and fireproofing such structures. Fig. 15 is a like view taken through a Z-bar column covered with my combined ventilated furring or facing blocks or tiles. Fig. 16 is a horizontal section taken through a square wooden column or beam with my combined ventilated blocks or tile applied thereto.

Referring to Fig. 1 of the drawings, the numeral 1 designates a combined ventilated brick and tile, such as is especially adapted for application to walls. This brick tile has a substantially rectangular body portion 2, a reduced neck 3, and an extended face 4. Openings 5 are formed in the body portion of the brick tile and air passages or ducts 6 7 are formed in the necks 3 in both vertical and horizontal directions. A metal I-beam 8 is set into the wall to support the floor and ceiling, and air-pipes 9 and 10 may be arranged to span the I-beams to conduct the air from the ceiling to the floor across the beam. These pipes may be either square or round in cross-section. Plastering 11 may be applied to the face 4 of the brick, or said face may be glazed or finished as a tile-facing. The floor filling-blocks 12 shown in this figure are provided with openings 13 and air holes or passages 14. The lower ends of these filling-blocks are provided with reduced necks 15, having air-passages 16 through them. The shape of the filling-blocks may be varied within certain limits, as shown in this figure, and the flooring-concrete 17 may be applied directly to the top of the filling-blocks, as shown at the left in said figure, or a small brick tile 18 may be applied to the upper surface of the filling-blocks. These small brick tile may have glazed or finished faces, or they may have concrete or cement 19 applied thereto and a separate tile laid thereon, if desired. It will be observed that by the construction shown air is permitted to pass up and across the walls and up and around the beams; also, that air circulates freely under the floor and above the ceiling, as indicated by the arrows.

As shown in Fig. 2, the floor filling-blocks may have roughened faces at the top and bottom for anchoring the concrete or cement 20 to support the tiles 21 and for the ceiling-plaster 22. As shown at the right-hand side in said figure, the upper face of the filling-block 23 is glazed or finished to serve as a floor-tiling. Air circulates through the openings, as indicated by the arrows.

The segmental arch (shown in Fig. 3) consists of the metal I-beams 24, the filling-blocks 25, the concrete 26, and the brick tiles 27. The shapes of the filling-blocks vary to some extent, and the small brick tiles 27 for the floor may either be covered by cement or concrete or may be finished on the upper face as a floor-tile.

As shown in Fig. 4, my invention is applied to wooded-beam floors. The brick tiles 28 rest upon the subfloor 29, and their upper faces may be either glazed to serve as floor-tiles or may be covered by concrete. The ceiling-tiles 30 may be substantially like the floor-tiles and may also have the ventilating-openings, as shown by the arrows.

Filling-blocks such as shown in Fig. 5 may be used to advantage in certain structures and a thorough ventilation attained.

The I-beams 31, Fig. 6, support the skew-backs 32, and the filling-blocks 33 (shown in Fig. 7) may be of various shapes to fill in the space between the skewbacks, as will be readily understood.

In Fig. 8 the filling-blocks have grooved upper and lower faces for anchoring the plaster, cement, or concrete, and the air holes or passages 34 extend through the walls of the filling-blocks in many directions, giving thorough ventilation between floors and ceilings.

The constructions shown in Figs. 9 and 10 may also be adopted for certain purposes and a complete circulation of air acquired.

The hollow filling-blocks shown in Figs. 11 and 12 are provided with air-passages, as indicated by the arrows, thus permitting air to circulate in all directions and freely between the floor and ceiling.

The wood-beam floor shown in Fig. 13 has ventilated brick tiles 35 secured to the beams by the light L-irons 36.

Referring to Fig. 14, it will be seen that with very slight modification as to shape my brick tile can be made available for covering, ventilating, and fireproofing round iron columns. As shown in this figure, the bricks or tiles are set on end against the columns, the outer face being slightly convex and the inner surface being concave to fit snugly against the column, thus forming a double-surfaced brick tile. Small filling-bricks may or may not be placed between the brick tiles to make a solid furring, and plastering or cement may be applied to the outer face of the tile, or they may be glazed to finish the column. This construction gives a complete vertical and lateral ventilation around the column and renders it thoroughly fireproof.

For covering Z-bar columns very slight modification is necessary in the shape of the brick tile. In Fig. 15 the numeral 37 designates the Z-bars, and 38 the metal face-plates of the column. The ventilated brick tile 39 are arranged, as shown, to form a furring or finishing tile.

Round or square wooden columns may be rendered thoroughly fireproof and durable by the use of my brick tiles, as shown in Fig.

16. The tiles or bricks in this figure are substantially like those shown in the previous figures and are provided with ventilating-openings to provide for a free circulation of air laterally and vertically.

From the foregoing it will be obvious that my combined ventilated brick and tile is capable of a very extended use in fireproof and other structures, and it will also be apparent that a thorough ventilation or heating of structures is attained by their use, while the advantage of a light, strong, and durable construction is a result of considerable importance.

By reference to Figs. 15 and 16 it will be seen that the corner-tiles *a b* have a diagonal or mitered body portion and projected or elongated surfaces *c*, thus making a smooth close joint throughout the body portion as well as at the outer corners. In Fig. 15 it will be seen that I may utilize the rectangular body portion provided with an elongated tile or facing *d* to a greater extent on one side than the other.

Having thus fully described my invention, what I claim is—

1. A brick tile comprising a skeleton portion, a reduced neck near each end of said body portion, lateral air-ducts extending through the necks, and extended surfaces outside the necks.

2. A brick-tile filling having a skeleton body portion, a reduced neck near each end, extended roughened surfaces, and air-ducts, substantially as described.

3. A brick tile comprising a skeleton body portion, reduced necks near each end of the brick, and extended tile-surfaces.

4. A brick tile for covering round columns, said brick tile having a concave inner surface, a convex outer surface, a skeleton or open body portion, and a reduced neck between the surfaces and the body portion, said neck having lateral air-ducts.

5. A brick tile for covering columns, said brick comprising a body portion, a reduced neck at each end of the body portion, air-ducts passing through the necks and extended surfaces, substantially as described.

6. A brick tile having an extended surface, a reduced neck behind it, air-ducts in the neck, and a tapering skeleton body portion.

7. A brick tile having an extended surface, a body portion, a neck intermediate the body and surface, air-ducts in the neck, and a bearing-surface of less area than the face, substantially as described.

8. A brick tile having a tapering body portion, a neck at each end of said body portion, surfaces extended beyond the necks, one of said surfaces being of greater area than the other.

9. A brick tile comprising a tapering body portion, perforated necks, one at each end of the body portion, and surfaces of different areas extending beyond the necks and body portion, substantially as described.

10. A fireproof structure provided with air-openings in the brick-tile fillings, and facings, said openings extending vertically through the walls of the fillings and through the necks of the tiles, substantially as described.

11. A brick filling, having a hollow body portion, air-holes extending through the walls of said hollow portion and reduced necks having air-holes extending at right angles to the air-holes in the body portion.

12. A ventilated fireproof structure provided with air-ducts in the walls, air-holes in the floor-filling, said air-holes extending vertically and horizontally, and communicating with the air-ducts in the walls.

In testimony whereof I affix my signature in presence of two witnesses.

DAVID WILEY ANDERSON.

Witnesses:
JULIAN T. WRIGHT,
C. G. PETTIT, Jr.